United States Patent [19]
Sadek et al.

[11] Patent Number: 5,907,234
[45] Date of Patent: May 25, 1999

[54] THYRISTOR-SWITCHED CAPACITOR BANK

[75] Inventors: Kadry Sadek; Marcos-Antonio Cavalcanti Pereira, both of Erlangen, Germany

[73] Assignee: Siemens Aktiengesellschaft, Munich, Germany

[21] Appl. No.: 09/018,605

[22] Filed: Feb. 4, 1998

Related U.S. Application Data

[63] Continuation of application No. PCT/DE96/01345, Jul. 22, 1996.

[30] Foreign Application Priority Data

Aug. 4, 1995 [DE] Germany .................. 195 28 766

[51] Int. Cl.$^6$ .................................................. G05F 1/70
[52] U.S. Cl. ............................................................. 323/210
[58] Field of Search .......................... 323/205, 208–210; 363/54, 85, 128

[56] References Cited

U.S. PATENT DOCUMENTS

| | | | |
|---|---|---|---|
| 4,571,535 | 2/1986 | Gyugyi .................................. | 323/211 |
| 4,638,238 | 1/1987 | Gyugyi et al. ........................ | 323/211 |
| 4,719,402 | 1/1988 | Brennen et al. ...................... | 323/211 |
| 5,093,630 | 3/1992 | Sato ...................................... | 323/210 |

FOREIGN PATENT DOCUMENTS

| | | |
|---|---|---|
| 0 116 275 B1 | 8/1984 | European Pat. Off. . |
| 24 56 895 C3 | 6/1975 | Germany . |
| 28 04 481 C2 | 8/1979 | Germany . |

OTHER PUBLICATIONS

"Static Compensators and their Components" (Tyll), Wattless Power Compensation, vol. 112, No. 45, 1991, pp. 17–19.

"Controlled Parallel –and Series Compensation" (Thumm et al.), Electrie, vol. 45, No. 3, 1991, pp. 88–90.

"Pour un réseau électrique plus performant: le projet FACTS" (Le Du), RGE Revue Generale de l'Electricite, No. 6, Jun. 1992, pp. 105–121.

"Modeling and Testing of a Thyristor for Thyristor Controlled Series Compensation (TCSC)" (McDonald et al.), IEEE Transactions on Power Delivery, No. 1, pp. 352–359.

"A Thyristor Controlled Series Compensation Model for Power System Stability Analysis" (Paserba et al.), IEEE Transactions on Power Delivery, vol. 10, No. 3, 1995, pp. 1471–1478.

"Concept of a Combined Short Circuit Limiter and Series Compensator" (Karady), IEEE Transactions on Power Delivery, vol. 6, No. 3, 1991, pp. 1031–1037.

*Primary Examiner*—Matthew Nguyen
*Attorney, Agent, or Firm*—Herbert L. Lerner; Laurence A. Greenberg

[57] ABSTRACT

A thyristor-controlled capacitor bank includes a thyristor switch and a capacitor bank. The capacitor bank is split into at least two series-connected capacitor groups. A series circuit including a thyristor switch and an inductor coil is connected in parallel with the capacitor group which is remote from a capacitor group at a mains power supply connection. A thyristor-switched capacitor bank is thus obtained which has a thyristor switch that therefore only needs to be constructed for a fraction of the mains power supply voltage itself, which is a major advantage for economic reasons.

5 Claims, 2 Drawing Sheets

THYRISTOR-SWITCHED CAPACITOR BANK

CROSS-REFERENCE TO RELATED APPLICATION

This application is a continuation of International Application PCT/DE96/01345, filed Jul. 22, 1996, which designated the United States.

BACKGROUND OF THE INVENTION

FIELD OF THE INVENTION

The invention relates to a thyristor-switched capacitor bank having a thyristor switch and a capacitor bank.

A solid-state compensator, which is also referred to as a Static Var Compensator (SVC) includes one or more parallel-connected inductive and capacitive paths, which are connected to a high-voltage mains power supply through a dedicated transformer or else through a tertiary winding of a mains power supply transformer. As a result of a rated voltage on the secondary side of the transformer being fixed, the use of a dedicated transformer offers the capability of constructing the equipment optimally in terms of its current and voltage control. A direct connection may also be economical in medium-voltage mains power supplies up to 30 kV.

The total amount of capacitance is provided through permanently connected or switched capacitors (capacitor bank) that are also referred to as a Fixed Capacitor (FC), or thyristor-switched capacitors that are also referred to as a Thyristor Switched Capacitor (TSC). A thyristor switch which includes a plurality of series-connected, reverse-parallel or anti-parallel thyristors is normally used for that application. The capacitor bank must then be provided with a protective inductor, in order to limit an inrush current gradient. The use of mechanically switched capacitors is subject to operational limitations. The capacitor bank must always be discharged through a power switch during switching on (for example through a discharge resistor or a transformer) in order to keep equalization processes during switching-on as small as possible and thus to prevent overloading. In comparison therewith, a thyristor as a switch offers the advantage of permitting the capacitor bank to be connected and disconnected from any charge state and as frequently as desired with the minimum possible equalization process. The controller (intelligence) which is required for that purpose can easily be implemented by using digital technology.

The total amount of inductance is provided through inductor coils. They can either be switched (Thyristor Switched Reactor (TSR)), or else the reactive volt-amperes at the fundamental frequency can be controlled (Thyristor Controlled Reactor (TCR)) using an appropriate controller. To that end, the entire amount of the reactive volt-amperes emitted to the mains power supply from the solid-state compensator can be adjusted infinitely variably in terms of the capacitive or inductive reactive volt-amperes required at the mains power supply point.

Continuous control of a TCR path is always linked to the production of harmonic currents, which must be kept away from the transmission grid by the use of filters at the TCR connection point. The production of harmonics can be completely prevented only by the inductive path being operated in such a way that it is switched identically to the capacitive path (Thyristor Switched Reactor (TSR)). The installed inductive volt-amperes are then only connected or disconnected in the same way as in the case of a thyristor-switched capacitor bank (Thyristor Switched Capacitor (TSC)).

In principle, the solid-state compensator can carry out various control tasks. When used in transmission grids, the primary task is voltage control. The solid-state compensator can thus also contribute to limiting overvoltages at the operating frequency, can make a contribution to improving the grid stability and can also damp volt-ampere fluctuations between grid sections.

An article entitled "Statische Kompensatoren und ihre Komponenten" [Solid-State Compensators and their Components], printed in the German journal "etz", Volume 112 (1991), Issue 17, pages 926 to 930, discusses circuit types, application and structural criteria for the components used in solid-state compensators using thyristor technology. The solid-state compensators which are implemented and referred to each include a plurality of power-factor correctors, which are connected to a high-voltage mains power supply through the use of a transformer. The selection and combination of the various power-factor correctors depends essentially on the requirements of the mains power supply. The following viewpoints, inter alia, have to be considered in that case: total cost of the compensator, loss assessment, reliability, maintenance costs and the capability of the compensator to be upgraded. For example, the SVC system at Kemps Creek, Australia includes a thyristor-switched inductor (TSR) and two thyristor-switched capacitor banks (TSC). The three phases of each of those power-factor correctors are electrically connected in delta and are of identical construction.

As already mentioned, the capacitor bank of the thyristor-switched capacitor bank (TSC) should always be discharged during switching-on. As a rule, the capacitor bank is disconnected from the AC mains power supply at the current zero crossing, that is to say at the instant when the mains power supply voltage is at a maximum. If the discharging of the capacitor bank through a discharge circuit is a slow process in comparison with the period of the AC voltage, then virtually twice the maximum mains power supply voltage occurs on the thyristor switch after half a cycle. Relatively expensive thyristors having an increased withstand voltage must be used for the thyristor switch, or a plurality of thyristor switches must be connected in series. If incorrect triggering of a thyristor were then to occur at the least favorable point in time, the capacitor bank would be recharged to a maximum of three times the mains power supply voltage amplitude.

In order to ensure that the thyristor switch only need be constructed for the maximum mains power supply voltage itself, which is a major advantage for economic reasons, the capacitor bank must be able to be discharged through a discharge circuit sufficiently quickly, at the most within one half-cycle of the AC voltage. If the AC voltage frequency is 50 Hz, the duration of one half cycle is 10 ms. The capacitor bank normally has a capacitance on the order of magnitude of several 100 $\mu F$. In order for it to be possible for such a large capacitor bank to be able to be discharged in 10 ms at all, the discharge circuit must have a low impedance. For example, a purely non-reactive resistor in the discharge circuit must have a value of only a few ohms which, for the capacitor, represents virtually a short circuit with a correspondingly high power loss, that cannot be tolerated when the capacitor bank is connected to the AC mains power supply.

European Patent 0 116 275 B1 discloses a reactive volt-ampere compensator, a discharge circuit having at least one inductive impedance element being connected in parallel with a thyristor-switched capacitor bank, and a first control unit being provided for the thyristor switch. The first control unit produces triggering signals for the thyristor switch from current and voltage measurement signals from an AC mains power supply which is to be corrected. The discharge circuit is permanently closed and the inductive impedance element is variable in such a manner that its value is greater in the operating state when the thyristor switch is closed and is less when the thyristor switch is open. One advantage of that device is that rapid and continuous discharging of the capacitor bank, after it has been disconnected from the AC mains power supply, takes place without any switching elements in the discharge circuit of the capacitor bank. Such switching elements would be susceptible to defects and would be expensive. An iron-cored discharge-circuit inductor is provided as the inductive impedance element. The iron core is at least largely unsaturated at that current which flows through the inductor when the thyristor switch is closed, and is increasingly saturated with greater currents. Its winding impedance is selected in such a way that the discharging of the capacitor bank corresponds to an RC discharge with a priori damping. As a result of the saturation characteristics of its iron core, the discharge-circuit inductor thus acts as a variable impedance element in the discharge circuit, having an impedance which is greater when the capacitor is being connected to the AC mains power supply, that is to say when the thyristor switch is closed, than when the capacitor bank is disconnected from the AC mains power supply with the thyristor switch open. The difference between those two states in that case is so significant that only a small, insignificant current flows in the first-mentioned case during discharge, while a greater current, which discharges the capacitor bank in less than one half-cycle of the AC voltage, can flow in the second case. In addition, the discharge circuit may be permanently closed. There is no need for any interruption in the charging circuit while the capacitor bank is connected to the AC mains power supply. That results in the thyristor voltage being relatively low, and the costs of expensive high-voltage thyristors are thus saved.

SUMMARY OF THE INVENTION

It is accordingly an object of the invention to provide a thyristor-switched capacitor bank, which overcomes the hereinafore-mentioned disadvantages of the heretofore-known devices of this general type and in which the thyristor voltage is relatively low, with no special discharge circuit being used.

With the foregoing and other objects in view there is provided, in accordance with the invention, a thyristor-switched capacitor bank, comprising a capacitor bank divided into at least two series-connected capacitor groups, one of the capacitor groups disposed at a mains power supply connection and at least one other of the capacitor groups remote from the one capacitor group; and a series circuit including a thyristor switch and an inductor coil, the series circuit connected in parallel with the at least one other capacitor group.

In accordance with another feature of the invention, the one capacitor group is directly associated with the mains power supply connection and has the greatest capacitance value of the capacitor groups.

In accordance with a further feature of the invention, the at least one other capacitor group has capacitance values selected as a function of a permissible off-state voltage of the associated thyristor switch.

In accordance with an added feature of the invention, the at least one other capacitor group is two capacitor groups.

In accordance with a concomitant feature of the invention, the thyristor switch includes reverse-parallel thyristors.

As a result of the fact that the capacitor bank of a thyristor-switched capacitor bank (TSC) is distributed into at least two series-connected capacitor groups, that capacitor group which is remote from a capacitor group at the mains power supply connection being provided with a series circuit in parallel with it, which series circuit has a thyristor switch and an inductor coil, provides a capacitive voltage divider in such a way that the thyristor switch is loaded with a voltage value proportional to the voltage ratio. As a result of the capacitor bank being split into a plurality of capacitor groups, having capacitance values which can be freely selected, the voltage across each thyristor switch corresponds to the voltage across the associated capacitor group.

The thyristor switch can thus be constructed for a fraction of the maximum mains power supply voltage. A further advantage of this thyristor-switched capacitor bank according to the invention is that the capacitances of an individual capacitor bank can be varied in steps, which are a fraction of the total capacitance of the capacitor bank, depending on the combination of the thyristor switches which are switched on and off.

Other features which are considered as characteristic for the invention are set forth in the appended claims.

Although the invention is illustrated and described herein as embodied in a thyristor-switched capacitor bank, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
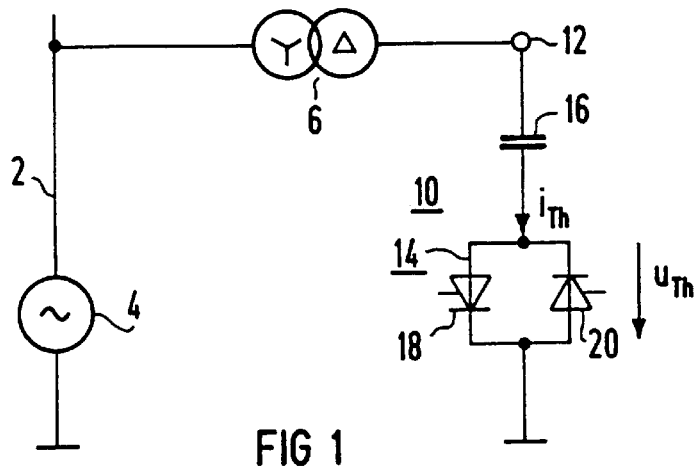
FIG. 1 is a schematic circuit diagram of a known thyristor-switched capacitor bank.

Referring now in detail to the figures of the drawings, in which corresponding parts and variables are provided with corresponding reference symbols, and first, particularly, to FIG. 1 thereof, it is seen that reference numeral 2 designates a line of an electrical AC mains power supply, which is fed from a generator 4. A transformer 6 is connected to this line 2, and a thyristor-switched capacitor bank 10 is connected to a secondary winding of the transformer 6 through the use of a mains power supply connection 12. This thyristor-switched capacitor bank 10 includes a thyristor switch 14 and a capacitor bank 16, which are electrically connected in series. The thyristor switch 14 is formed of reverse-parallel thyristors 18 and 20. Triggering electrodes of these thyristors 18 and 20 are connected to a non-illustrated control unit which uses signals from the mains power supply, in a manner that is known per se and will therefore also not be explained in more detail, in order to produce pulses for the thyristors 18 and 20 of the thyristor switch 14. The pulses are in the correct phase required for the reactive volt-amperes in the AC mains power supply. The transformer 6 is used only for matching the mains power supply voltage to the voltage which has been selected, for economic reasons, for the thyristor-switched capacitor bank 10. The thyristor-switched capacitor bank 10 can also be connected directly to the mains power supply. The capacitor bank 16 can be switched on or off in a very short time through the use of the thyristor switch 14. Switching-on takes place in such a way that any equalization processes which occur are as small as possible. Since this cannot be achieved in all operating conditions, inductor coils are provided, which limit the inrush current of the capacitor bank 16. These inductor coils are not illustrated for the sake of clarity in this illustration.

When the thyristor switch 14 is closed, that is to say when it is electrically switched on, and the capacitor bank 16 is thus connected to the AC mains power supply, then the voltage across the capacitor bank 16 corresponds to the mains power supply voltage at any instant. When the capacitor bank 16 is disconnected from the AC mains power supply by opening the thyristor switch 14, then the thyristor switch 14 adopts the capacitor voltage at the switching instants and, in consequence, with the changing of the capacitor voltage and of the mains power supply voltage, in each case adopts the difference in voltage from both. As a rule, the capacitor bank 16 is disconnected from the AC mains power supply at the zero crossing, that is to say at the instant when the mains power supply voltage is at a maximum.

The capacitor bank 16 would only discharge very slowly without a discharge circuit. That would result in a thyristor voltage $U_{th}$ being virtually twice as great as the mains power supply voltage amplitude at the instant when the mains power supply voltage is at a minimum. Relatively expensive thyristors 18 and 20 with an increased withstand voltage would have to be used for the thyristor switch 14, or a plurality of thyristor switches 14 would have to be connected in series. If incorrect triggering of a thyristor 18 or 20 in the thyristor switch 14 were then to occur at the least favorable instant, the capacitor bank 16 would be recharged to a maximum of three times the mains voltage amplitude.

Figure 2:
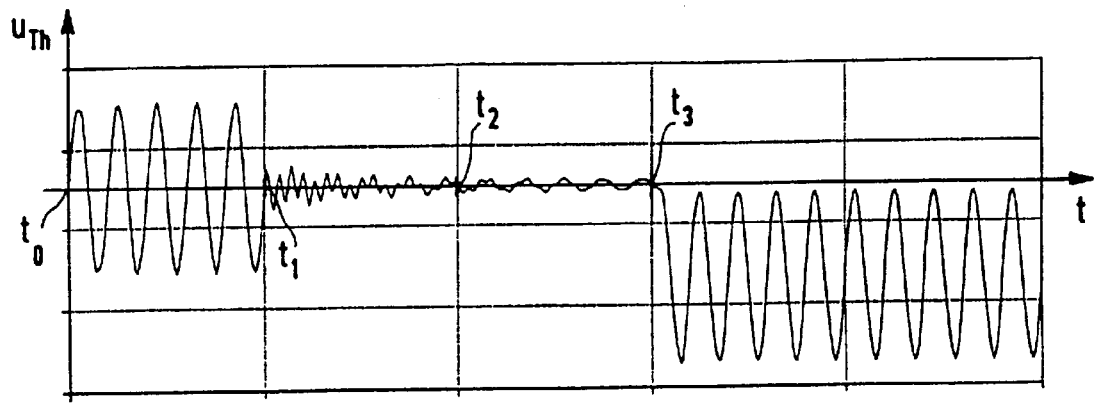
FIG. 2 is a graph which illustrates the behavior of an associated thyristor voltage plotted with respect to time t.
Figure 3:
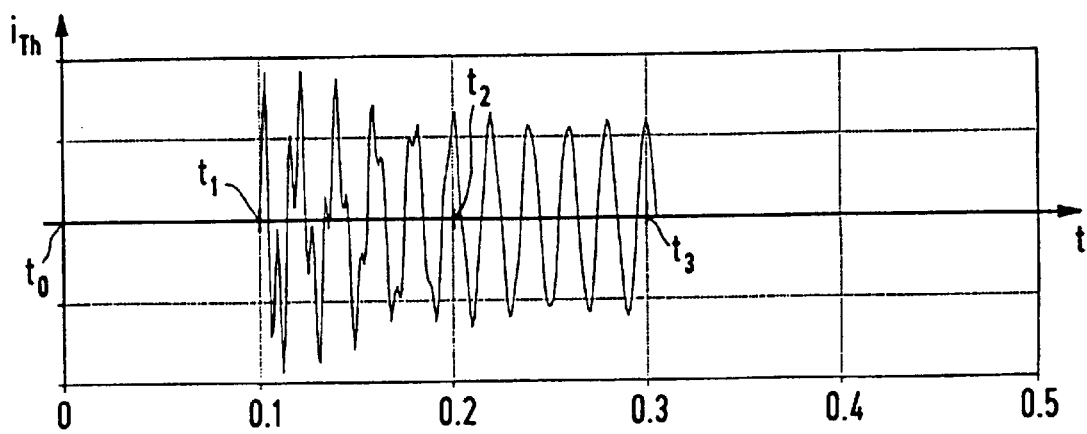
FIG. 3 is a graph which illustrates the behavior of an associated thyristor current plotted with respect to time t.

FIGS. 2 and 3 respectively show the behavior with respect to time of the thyristor voltage $U_{Th}$ and a thyristor current $i_{Th}$, for this thyristor-switched capacitor bank 10, in a graph plotted with respect to time t. It can be seen from these illustrations that the thyristor switch 14 is switched off during a time period $t_1$–$t_0$, since the thyristor current $i_{Th}$ is equal to zero and the thyristor voltage $u_{Th}$ follows the AC voltage at the mains power supply connection 12. The thyristor switch 14 switches on at the instant $t_1$, so that the thyristor voltage $u_{Th}$ becomes approximately zero. Since the thyristor switch 14 has an impedance, a residual voltage is shown in the illustration according to FIG. 2. This residual voltage and the thyristor current $i_{Th}$ are subject to harmonics. These harmonics depend on the transient process of the thyristor-switched capacitor bank 10. The thyristor switch 14 switches off again at an instant $t_3$. Irrespective of when the switching-off command occurs, the thyristors 18 and 20 cannot interrupt the current until their next zero crossing. At this moment, the capacitor bank 16 is charged to the peak value of the mains power supply voltage, and this value is then maintained in the form of a DC voltage on the capacitor bank 16. The difference between the mains power supply voltage and the capacitor voltage indicates the magnitude of the voltage across the thyristor switch 14 in the switched-off state. The voltage across the thyristor switch 14 therefore remains offset by the peak value of the mains power supply voltage from the instant $t_3$ until the capacitor bank 16 has been discharged. In consequence, the thyristor switch 14 is stressed to an increased extent (maximum instantaneous value of the thyristor voltage $u_{Th}$ is equal to twice the peak value of the mains power supply voltage).

Figure 4:
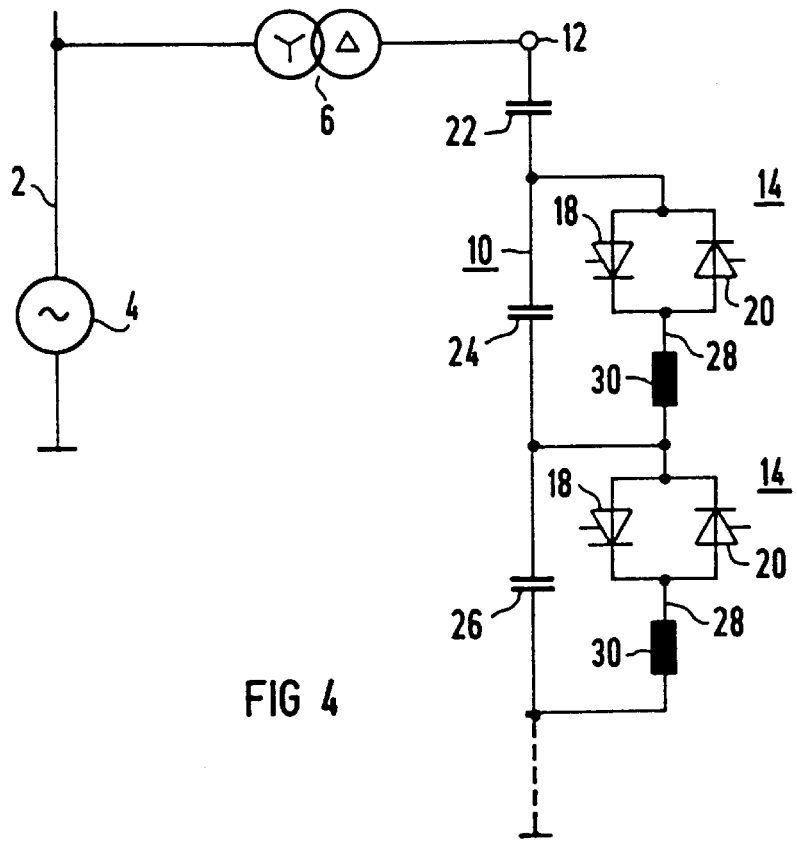
FIG. 4 is a schematic circuit diagram of a thyristor-switched capacitor bank according to the invention.

FIG. 4 shows one embodiment of a thyristor-switched capacitor bank 10 according to the invention. In the case of this thyristor-switched capacitor bank 10, the capacitor bank is split into three series-connected capacitor groups 22, 24 and 26, for example. A respective series circuit 28 formed by a thyristor switch 14 and an inductor coil 30 is electrically connected in parallel with each of the capacitor groups 24 and 26. The capacitor group 22, which is directly associated with the mains power supply connection 12 of the thyristor-switched capacitor bank 10, has the greatest capacitance value of the capacitor groups 22, 24, 26. These capacitor groups 22, 24, 26 form a capacitive voltage divider. The maximum voltage load on the thyristors 18 and 20 of the thyristor switches 14 can be predetermined by the selection of the capacitance values of the individual capacitor groups 24 and 26.

Figure 5:
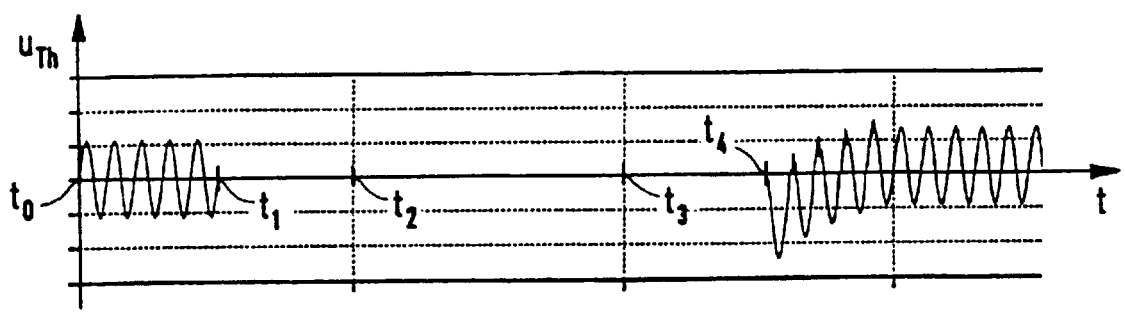
FIG. 5 is a graph which illustrates the associated thyristor voltage plotted with respect to time t.
Figure 6:
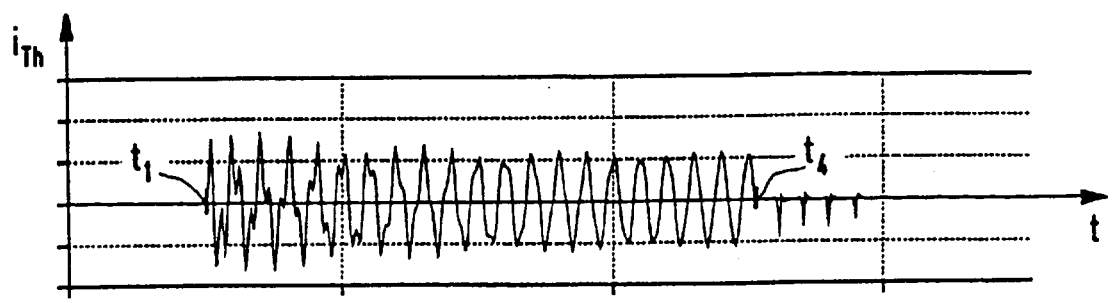
FIG. 6 is a graph which illustrates the behavior of the associated thyristor current with respect to time t.

FIGS. 5 and 6 respectively show the behavior with respect to time of the thyristor voltage $u_{Th}$ and of the thyristor current $i_{Th}$ for the embodiment of a thyristor-switched capacitor bank 10 of the invention according to FIG. 4, in each case in a graph plotted with respect to time. It can be seen from these illustrations that the thyristor switch 14 is switched off during the time period $t_1$–$t_0$, since the thyristor current $i_{Th}$ is equal to zero and the thyristor voltage $u_{Th}$ follows the AC voltage at the mains power supply connection 12. The thyristor switch 14 switches on at the instant $t_1$ so that the thyristor voltage $u_{Th}$ becomes zero. In this state, the thyristor switch carries the thyristor current $i_{Th}$, which is subject to harmonics because of the transient process. The thyristor switch 14 is switched off again at an instant $t_4$. When the current $i_{Th}$ in the thyristor switch 14 reaches zero, the thyristor switch 14 is switched off. The voltage across the capacitor bank starts from zero and builds up, which results in a shift in its behavior. The peak value of the voltage $u_{Th}$ in the first half-cycle thus reaches twice the nominal value of the voltage at the mains power supply connection 12. This is immediately followed by the immediate discharging of the capacitor bank 16 by deliberate triggering of the thyristor switches 14 through the use of a plurality of current pulses. In consequence, the shift in the voltage across the thyristor switch 14 is immediately canceled out.

The improvement of the thyristor-switched capacitor bank 10 according to the invention achieves the following advantages:

a) The capacitance of a thyristor-switched capacitor bank 10 can be varied in steps which are a fraction of the total capacitance of this capacitor bank, depending on the combination of thyristor switches 14 which are switched on and off.

b) The thyristor switches 14 need not be constructed for the voltage of the entire capacitor bank of the thyristor-switched switched capacitor bank 10, but instead corresponding to the voltage of the associated capacitor group 24 or 26.

c) In the event of a fault in the triggering of a thyristor switch 14, that thyristor switch 14 can then be protected by controlled switching-on. This is now acceptable with regard to mains supply operation, since the resultant change in the capacitance of the capacitor bank of the thyristor-switched capacitor bank 10 is limited to the effect of a single capacitor group 22. As a result of the controlled reduction in the voltage shift in a few cycles after the thyristor switch 14 is switched off each time (FIGS. 5 and 6), protective triggering is accordingly only necessary if a triggering fault takes place during this short time. In consequence, the thyristors 18 and 20 need no longer be constructed for three times the normal operating voltage.

In comparison with the prior art mentioned initially, the thyristors 18 and 20 of each thyristor switch 14 without a discharge circuit can be constructed for a fraction of the mains power supply voltage itself, which is a major advantage for economic reasons.

We claim:

1. A thyristor-switched capacitor bank, comprising:

a capacitor bank divided into at least two series-connected capacitor groups, one of said capacitor groups disposed at a mains power supply connection and at least one other of said capacitor groups remote from said one capacitor group; and a series circuit including a thyristor switch and an inductor coil, said series circuit connected in parallel with said at least one other capacitor group.

2. The thyristor-switched capacitor bank according to claim 1, wherein said one capacitor group is directly associated with the mains power supply connection and has the greatest capacitance value of said capacitor groups.

3. The thyristor-switched capacitor bank according to claim 1, wherein said at least one other capacitor group has capacitance values selected as a function of a permissible off-state voltage of said associated thyristor switch.

4. The thyristor-switched capacitor bank according to claim 1, wherein said at least one other capacitor group is two capacitor groups.

5. The thyristor-switched capacitor bank according to claim 1, wherein said thyristor switch includes reverse-parallel thyristors.

* * * * *